(12) United States Patent
Dhillon et al.

(10) Patent No.: US 7,916,894 B1
(45) Date of Patent: Mar. 29, 2011

(54) SUMMARY OF A VIDEO USING FACES

(75) Inventors: Samreen Dhillon, Jalandhar (IN); Harshdeep Singh, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 878 days.

(21) Appl. No.: 11/699,618

(22) Filed: Jan. 29, 2007

(51) Int. Cl.
*G06K 9/00* (2006.01)
*G06K 9/46* (2006.01)

(52) U.S. Cl. .................................. 382/103; 382/190

(58) Field of Classification Search .................. 382/103, 382/190
See application file for complete search history.

(56) References Cited

U.S. PATENT DOCUMENTS

| | | | | |
|---|---|---|---|---|
| 2001/0000025 | A1* | 3/2001 | Darrell et al. | 382/103 |
| 2001/0041020 | A1* | 11/2001 | Shaffer et al. | 382/305 |
| 2002/0031262 | A1* | 3/2002 | Imagawa et al. | 382/190 |
| 2007/0177805 | A1* | 8/2007 | Gallagher | 382/190 |

OTHER PUBLICATIONS

Liu et al., Major Cast Detection in Video Using Both Audio and Visual Information, Aug. 2002.
Dmitry Gorodnichy, "(Vision-based) Face Tracking," http://synapse.vit.iit.nrc.ca/doc/facetracking.html Jan. 17, 2007.

* cited by examiner

*Primary Examiner* — Hadi Akhavannik
(74) *Attorney, Agent, or Firm* — Van Pelt, Yi & James LLP

(57) ABSTRACT

A plurality of sets of face images associated with a video is obtained. Each set of face images corresponds to a particular person depicted in the video. Of the people associated with the plurality of sets of face images, one or more of those people are selected to be included in a facial summary by analyzing the plurality of sets of face images and/or the video. For each of the selected one or more people, a face image to use in the facial summary is selected. The facial summary is laid out using the selected face images.

23 Claims, 8 Drawing Sheets

SUMMARY OF A VIDEO USING FACES

BACKGROUND OF THE INVENTION

To represent a video (e.g., in a file system or a software application), a representative image is often used. In some systems, a frame from the video is selected (e.g., the first frame) and used as the representative image. In some cases, the people in the representative images are difficult to see because, for example, the representative image is relatively small and/or the selected frame is not a "close-up" frame. In some cases, a video contains more than one shot and information from some shots may not be included in the representative image if a single selected frame is used. Techniques to produce an improved representative image would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
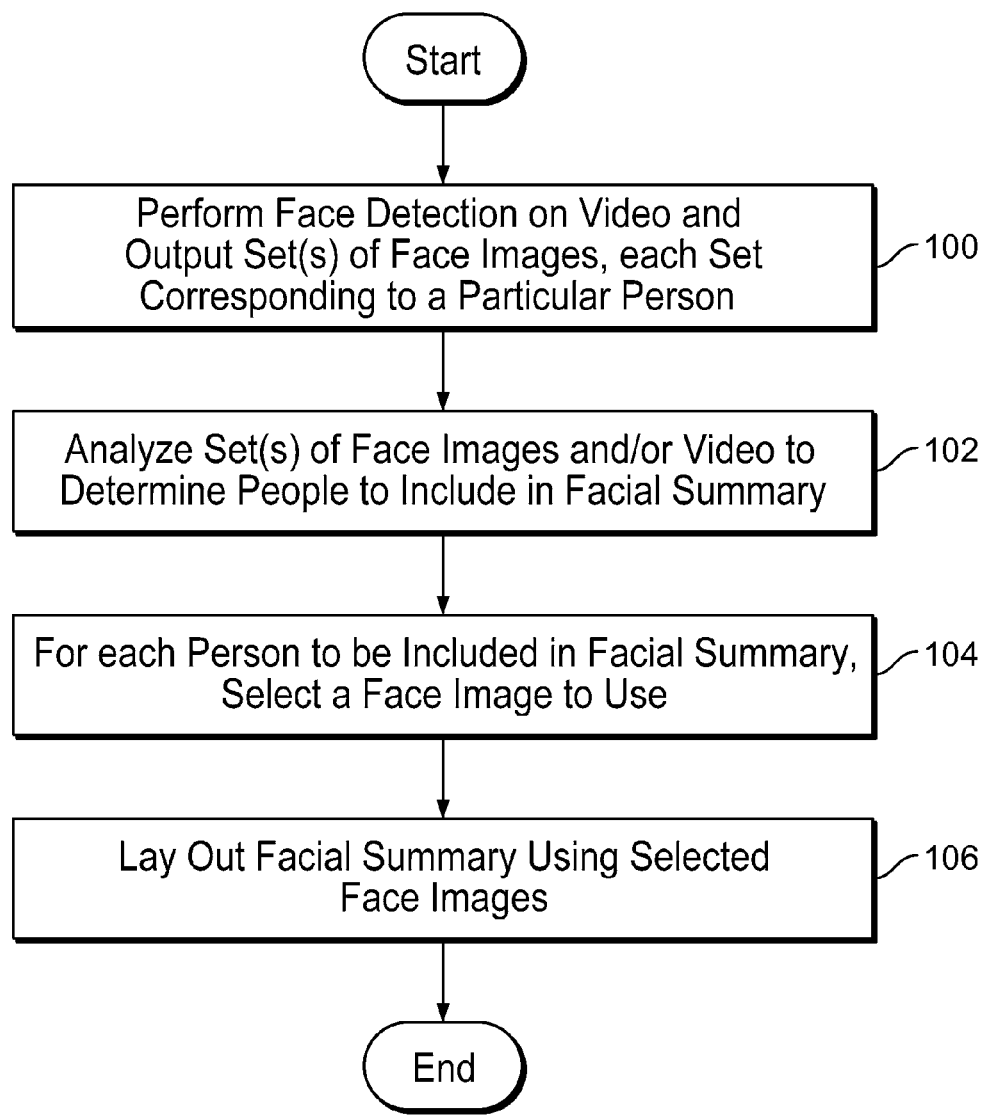
FIG. 1 is a flowchart illustrating an embodiment of a process for generating a facial summary.

FIG. 1 is a flowchart illustrating an embodiment of a process for generating a facial summary. In the example shown, a video is input to the process and a facial summary is generated for that video. A facial summary is an image that is a summary or representation of an associated video and includes faces. For example, an interface or application associated with organizing, editing, sharing, or storing video may use a facial summary to represent an associated video. Some example applications include Adobe® Premiere® (including Elements or Pro), Adobe® Bridge, Adobe® After Effects®, or Macromedia FlashCast™. In some embodiments, an interface that uses facial summaries is associated with a file system or an operating system (e.g., Windows Explorer). For example, videos stored in a directory called "My Videos" may be represented by their respective facial summaries. In some embodiments, facial summaries are used in web-based applications (e.g., via Microsoft Internet Explorer or Mozilla Firefox). Some web-based applications or websites provide video storage, distribution/access, manipulation, and/or searching capabilities and in some embodiments such a web-based application uses facial summaries.

In some cases, a video includes a single shot (i.e., a take) where a shot is a continuous sequence (e.g., taken without changing cameras or without pausing/stopping capture of the video). In other cases, a video includes multiple shots. In some cases, a video is a home video and in some cases is a dramatization. The content and/or quality of a video varies in various embodiments.

At 100, face detection is performed on a video and set(s) of face images, each set corresponding to a particular person, is/are output. A face detection process finds or otherwise locates faces in a video but may not necessarily identify who that particular person is. In some embodiments, a face detection process outputs the coordinates of a face in a frame and which frame the face is detected in. In some embodiments, a new or separate image is output. Any appropriate face detection process may be used; some examples include the Face Tagging feature in Adobe Photoshop Elements (e.g., version 5.0), eigenfaces, Haar-like feature detection, or Hidden Markov model. There are a variety of techniques available to group (e.g., detected) faces as belonging to the same person; any appropriate technology may be used. In some embodiments, a face detection process includes grouping techniques and what is output by an automatic face detection process are groups of faces, each group corresponding to a particular person. In some embodiments, two processes are performed: one to detect faces, and the other to group them.

At 102, the set(s) of face images and/or video is/are analyzed to determine people to include in facial summary. In some embodiments, there is some maximum number of faces included in a facial summary. In some cases, a facial summary will be relatively small (e.g., an inch or two high/wide) and it may be difficult for a user to easily discern the faces in a relatively small facial summary if there are too many faces in a facial summary. For example, there may be a limit of 4 faces in a facial summary.

In some embodiments, a determination at 102 is based on the number of faces for a given person detected by a face detection process in step 100. For example, the faces of three people may be detected at 100. The first person's face is detected 2 times (i.e., 2 faces images in the first set), the second person's face is detected 15 times (i.e., 15 face images in the second set), and the third persons' face is detected 13 times (i.e., 13 face images in the third set). The second and third person may be featured more prominently in the video than the first person, and in some embodiments those people are selected to be included in a facial summary based on the number of images in their respective set.

In some embodiments, a determination at 102 is based on the size of the faces detected at 100. For example, a person who is closer to the camera may be more important than someone who is further away from the camera. In some embodiments, a person is selected to be included in a facial summary based on the size of a face detected at 100.

In some embodiments, determining the people to include in a facial summary includes generating an importance value for each person detected (e.g., associated with the importance or prominence of that person in the associated video). In some embodiments, a ranking is determined and used.

At 104, for each person to be included in a facial summary, a face image to use is selected. In some embodiments, the face image selected comes from the set of face images detected at 100. In some of those embodiments, one or more rules or criteria is/are used to select the most attractive or desirable face image from a set of face images for a given person. Some example rules include a face image does not depict the person blinking, the person is looking forwards (e.g., as opposed to a profile captured from the side), lighting conditions are sufficient (i.e., brightness), the face image is sufficiently sharp (e.g., it is not blurry or out of focus), the contrast is sufficient, the face image is sufficiently large within a frame (e.g., the person is relatively close to the camera and/or a relatively large zoom/expansion is not required), etc.

The face images selected at 104 for a given facial summary do not necessarily come from the same frame or the same shot. In some cases, the most desirable or attractive face image detected for one person may not occur at the same time (i.e., in the same frame) as the best face for another person. In some embodiments, a face image selected at 104 is not obtained from the video. For example, performers such as dancers and actors often have headshots taken by professional photographers. In one example, the video is a performance and professionally taken headshots are used in a facial summary generated for the video. Any appropriate technique can be used to select a face image that is not obtained from the video itself. In some embodiments, face matching is used to associate a set of face images obtained from the video with a face image used in a facial summary. In some embodiments, a set of face images is tagged and the tag is associated with a pre-selected face image (e.g., a headshot).

At 106, a facial summary is laid out using the selected face images. In some embodiments, the size of the faces is proportional to or is otherwise based on an importance value. In some embodiments, faces in a facial summary have pre-defined or fixed sizes (e.g., based on ranking).

In various embodiments, a facial summary is output in variety of formats or data types. In some embodiments, an image file such as a Joint Photographic Experts Group (JPEG) file is output. In some embodiments, a facial summary is able to be edited using an image editing application such as Adobe® Photoshop®. For example, a user may (if so desired) add text to the facial summary, select and apply a background pattern, add an object to the facial summary (e.g., clip art, a logo, an icon, etc.), or adjust the placement of a face (e.g., nudge left/right, crop the face image, etc.).

Figure 2:
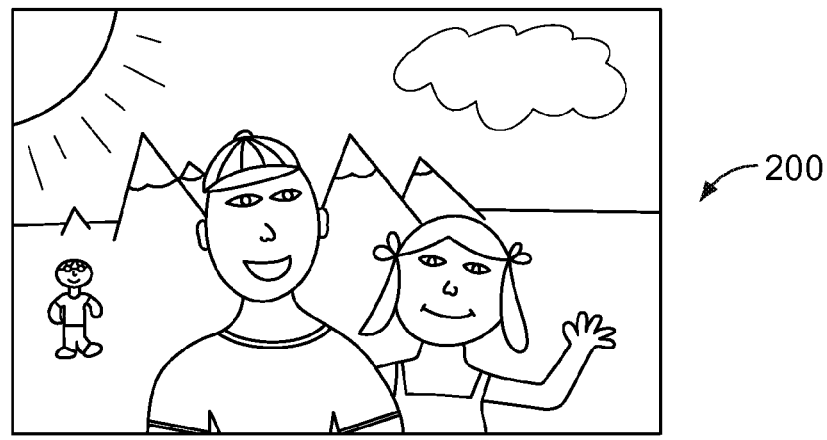
FIG. 2 is a diagram illustrating an example of three frames from a video.
Figure 2:
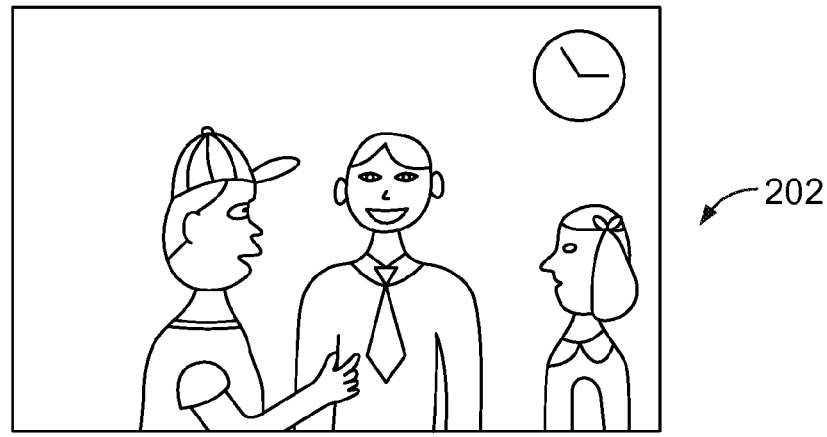
Figure 2:

FIG. 2 is a diagram illustrating an example of three frames from a video. In the example shown, the video includes an outdoor shot and an indoor shot. Frame 200 is associated with the outdoor shot and frames 202 and 204 are associated with an indoor shot.

Using the video associated with frames 200, 202, and 204, in various embodiments various facial summaries are generated. In some embodiments, a criteria for including a face in a facial summary is that the person is not blinking. For example, the person in the middle of the group in frame 204 is blinking and the person's face in frame 202 may be more attractive or recognizable. In some embodiments, selection of a face to use in a facial summary is based upon lighting conditions or brightness. For example, frame 200 has better lighting conditions compared to frame 204 (i.e., outdoor lighting compared to indoor lighting) and in some embodiments, a face from frame 200 is used instead of from frame 204. In some embodiments, a face image used in a facial summary is facing the viewer or camera. For example, in frame 202, the man on the left and the woman on the right are not facing forwards, and in some embodiments a face obtained from frame 200 or 204 is used instead for that man and/or woman. The following figure illustrates some embodiments of facial summaries.

Figure 3:
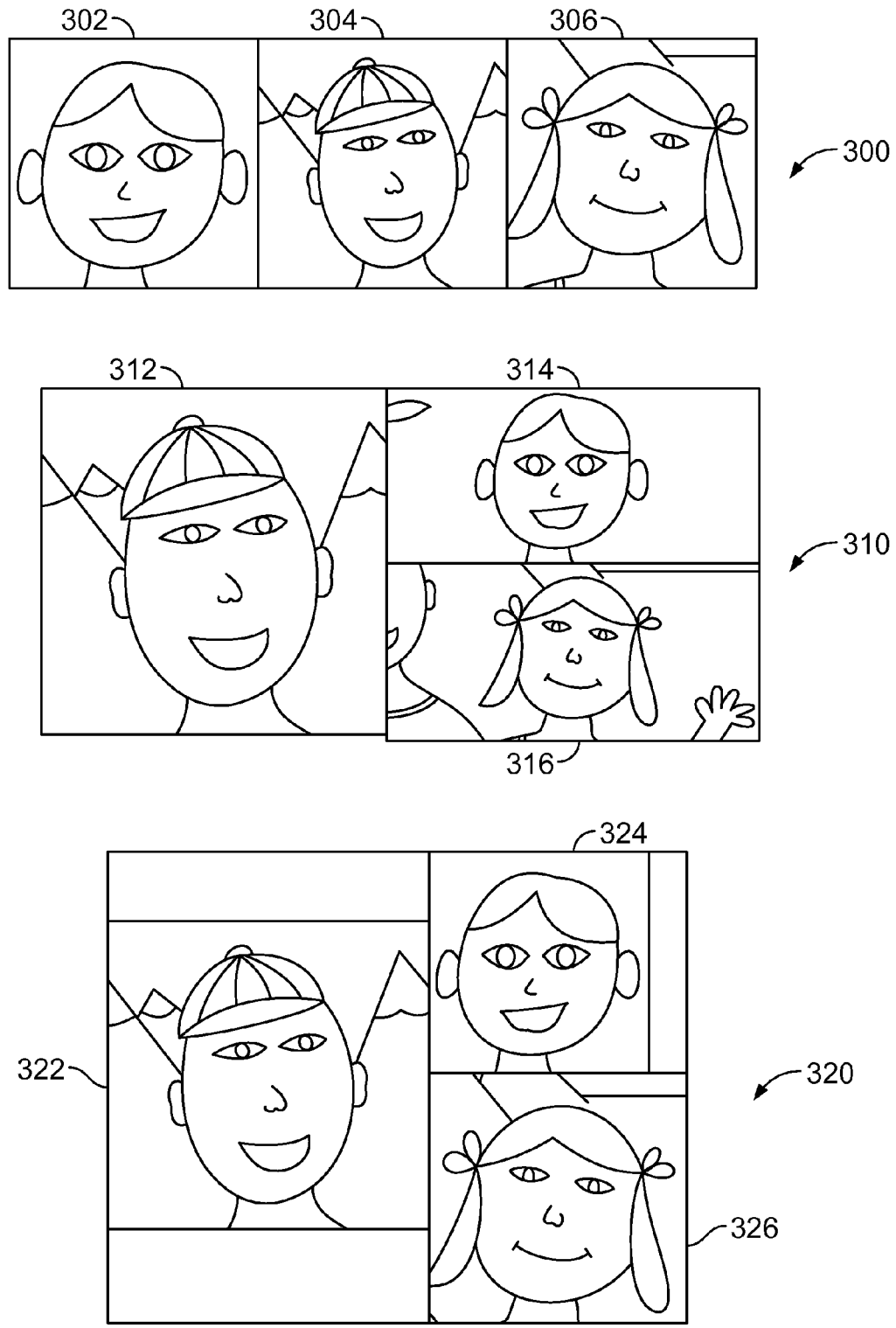
FIG. 3 is a diagram illustrating an embodiment of three facial summaries.

FIG. 3 is a diagram illustrating an embodiment of three facial summaries. In the example shown, facial summaries 300, 310, and 320 are generated using the video associated with frames 200, 202 and 204. Face images 302, 314, and 324 are obtained from frame 202. Face images 304, 312, and 322 are obtained from frame 200. Face images 306, 316, and 326 are obtained from frame 200.

In facial summary 300, face images 302, 304, and 306 are the same size. In facial summary 310, face images 314 and 316 are the same size and both are smaller than face image 312. In some embodiments, a facial summary is laid out or otherwise generated based on a ranking. For example, the person depicted in face image 312 may have the highest ranking and thus is the largest face in facial summary 310. In facial summary 320, the sizes of the face images correspond to or vary in accordance with an importance value (e.g., how prominent in a video a particular person is). For example, if the importance value associated with the person in face image 324 increases, the size of face image 324 may increase as well.

In various embodiments, a facial summary has various layouts, arrangements, or organizations and may vary from the examples shown herein. In some embodiments, there is a border or gap between faces in a facial summary whereas in other embodiments, faces take up all of a facial summary. In some embodiments, the size and/or placement of a face in a facial summary varies in accordance with an importance value. In some embodiments, the size and/or placement of a face in a facial summary depends on a ranking. Various shapes that contain a face may be used in a facial summary. In the examples shown herein, rectangular shapes are used but other shapes such as ovals, circles, or stars may be used.

Figure 4:
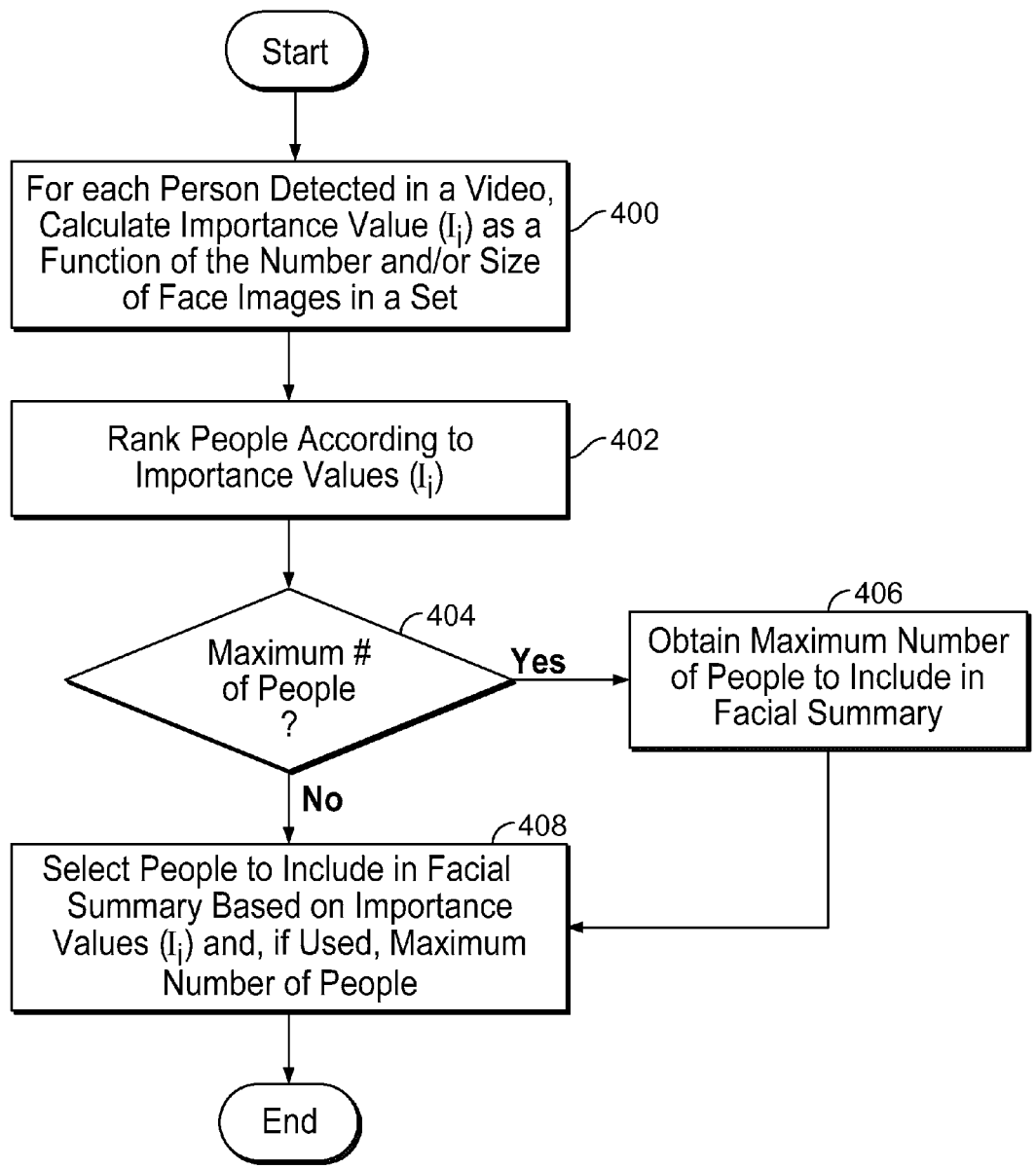
FIG. 4 is a flowchart illustrating an embodiment of a process for selecting people to include in a facial summary.

FIG. 4 is a flowchart illustrating an embodiment of a process for selecting people to include in a facial summary. In some embodiments, the example process is used at 102 to select people to include in a facial summary based on sets of face images and/or a video.

For each person detected in a video, an importance value ($I_i$) is calculated as a function of the number and/or size of face images in a set at 400. In some embodiments, a prominence score is a measure or estimate of how prominent or important a particular person is in a video. In some embodiments, $I_i=(w_1*F_i)+(w_2*R_i)$ where i is the index of the particular person for which the score is being calculated, $w_1$ and $w_2$ are weighting factors, $F_i$ is the number of faces in the set, and $R_i$ is the average area of face images in the set. In some embodiments, some other combination or function is used to calculate an importance value.

In some embodiments, other information is taken into consideration at 400. For example, a person whose face is in the center (e.g., of a frame) may be more important than someone whose face is at or near the edge; in some embodiments, the location or position of a face image within a frame of video is used. In some embodiments, a duration or time period during which a certain person's face appears in a shot or video is used. In some embodiments, once a person's face is detected, that person's face is tracked (e.g., in later frames or at a later point in time within the video) to determine a duration. In some embodiments, a process backtracks within a video once a face is detected (e.g., to ensure that there are no earlier frames in which the person's face was not detected). In some embodiments, some other technique is used to estimate, calculate, or otherwise determine a duration.

At 402, people are ranked according to the scores ($I_i$). It is determined at 404 if there are a maximum number of people. If so, the maximum number of people to include in a facial summary is obtained at 406. Some facial summaries are relatively small and in some embodiments there is a limit to the number of faces included in a facial summary. In other embodiments (e.g., where a facial summary is larger) there is no maximum number of people.

At 408, people to include in a facial summary are selected based on importance values ($I_i$) and, if used, a maximum number of people. For example, if there is a maximum of four people per facial summary, the four people with the highest importance values are selected.

In some embodiments, a threshold is used. For example, if a person's importance value is below the threshold, that person is not included in the facial summary. Usage of a threshold is not necessarily coupled to or tied to usage of a maximum number of people. For example, if there is no maximum, all people with importance values greater than the threshold are included in the facial summary. Otherwise, if there is a maximum (e.g., a maximum of 4 people per facial summary) the people with the highest scores that are greater than the threshold are selected.

In some embodiments, templates are used to lay out a facial summary. The following figure shows two such embodiments.

Figure 5:
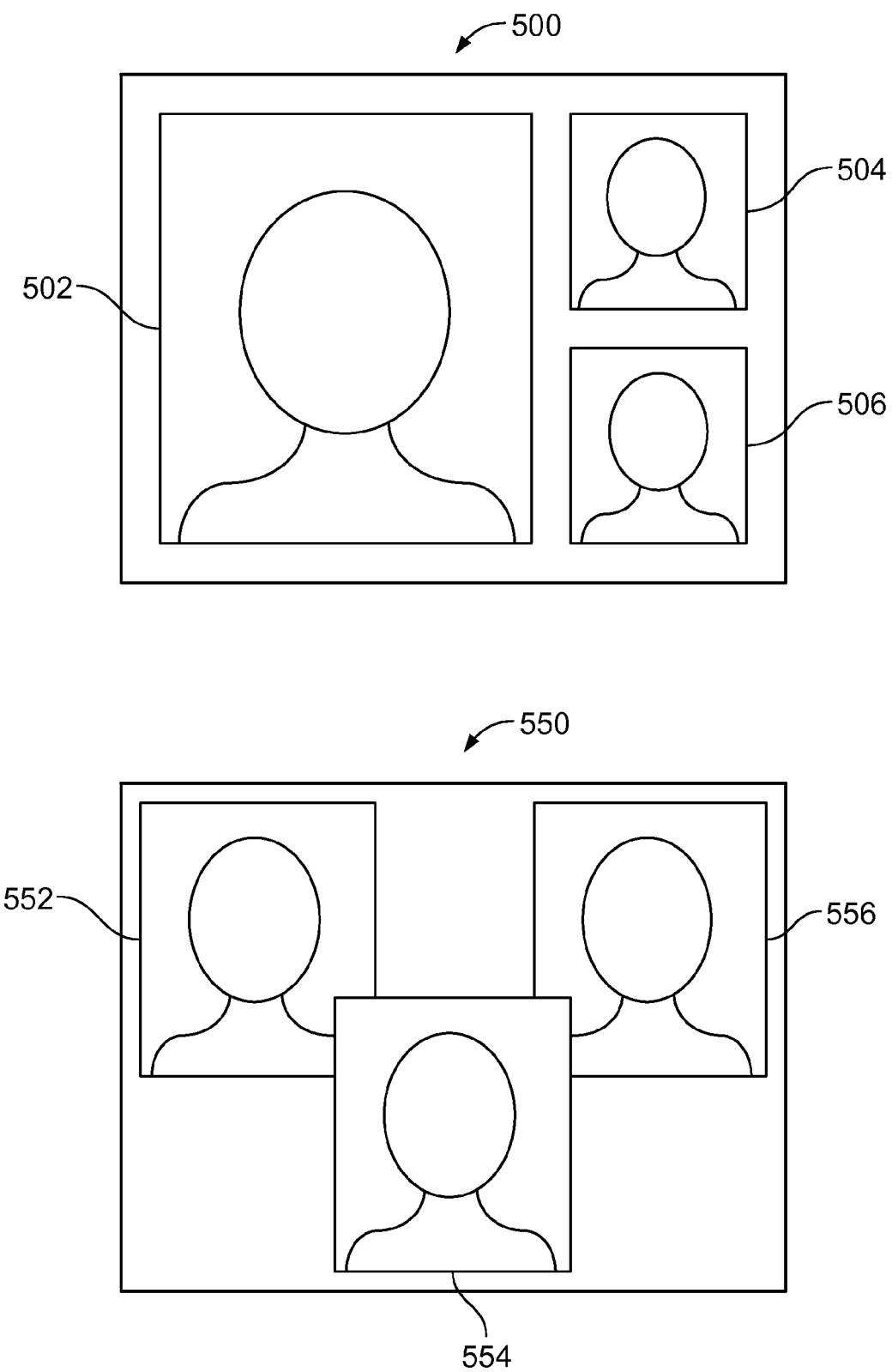
FIG. 5 is a diagram illustrating two embodiments of templates.

FIG. 5 is a diagram illustrating two embodiments of templates. In the example shown, templates 500 and 550 are used to lay out a facial summary with three faces. In some embodiments, a collection of templates includes templates designed to show various numbers of people. For example, three faces may need to be laid out, and templates 500 and 550 are obtained from some collection.

In template 500, cutout 502 is larger than cutouts 504 and 506, and cutouts 504 and 506 are the same size. In template 550, cutouts 552, 554, and 556 are all the same size. In some embodiments, importance values are used to select a template to use. For example, if three people are included in a facial summary and the importance values are relatively equal, template 550 may be selected where all of the cutouts are the same size. In other cases, the highest importance value is relatively large compared to the second and third highest importance values and template 500 is selected. In some embodiments, a statistical value (e.g., a standard deviation, an average, etc.) is used to select a template to use.

Once a template is selected, face images are placed in an appropriate cutout. Using a template, the size and location of faces predefined or set. For example, if template 500 is used, the face image with the highest importance value is placed in cutout 502. Processing is performed as needed on a face image to accommodate the dimensions or size of a cutout. For example, a face image may be resized and/or cropped to fit.

Figure 6:
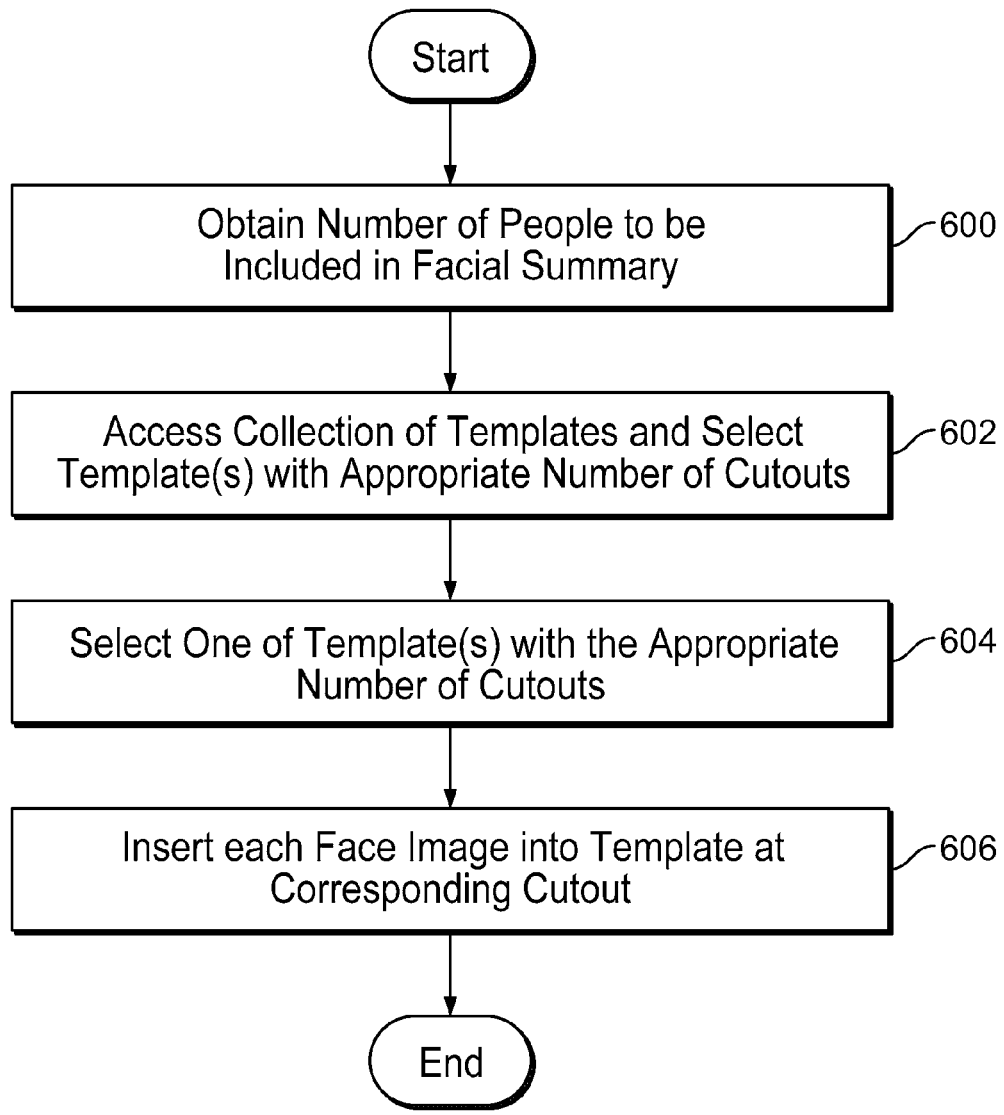
FIG. 6 is a flowchart illustrating an embodiment of a process for laying out a facial summary using templates.

FIG. 6 is a flowchart illustrating an embodiment of a process for laying out a facial summary using templates. In some embodiments, the example process is used at 106 to lay out a facial summary. In some embodiments, some other technique (e.g., that does not use templates) is used to lay out a facial summary.

At 600, the number of people to be included in a facial summary is obtained. A collection of templates is accessed and template(s) with the appropriate number of cutouts is/are selected at 602. For example, if three people are to be included in a facial summary, templates designed to display three faces are selected.

At 604, one of the template(s) with an appropriate number of cutouts is selected. For example, the template with cutout sizes that most closely match the importance values may be selected. Each face image is inserted into the template at a corresponding cutout at 606.

Figure 7:
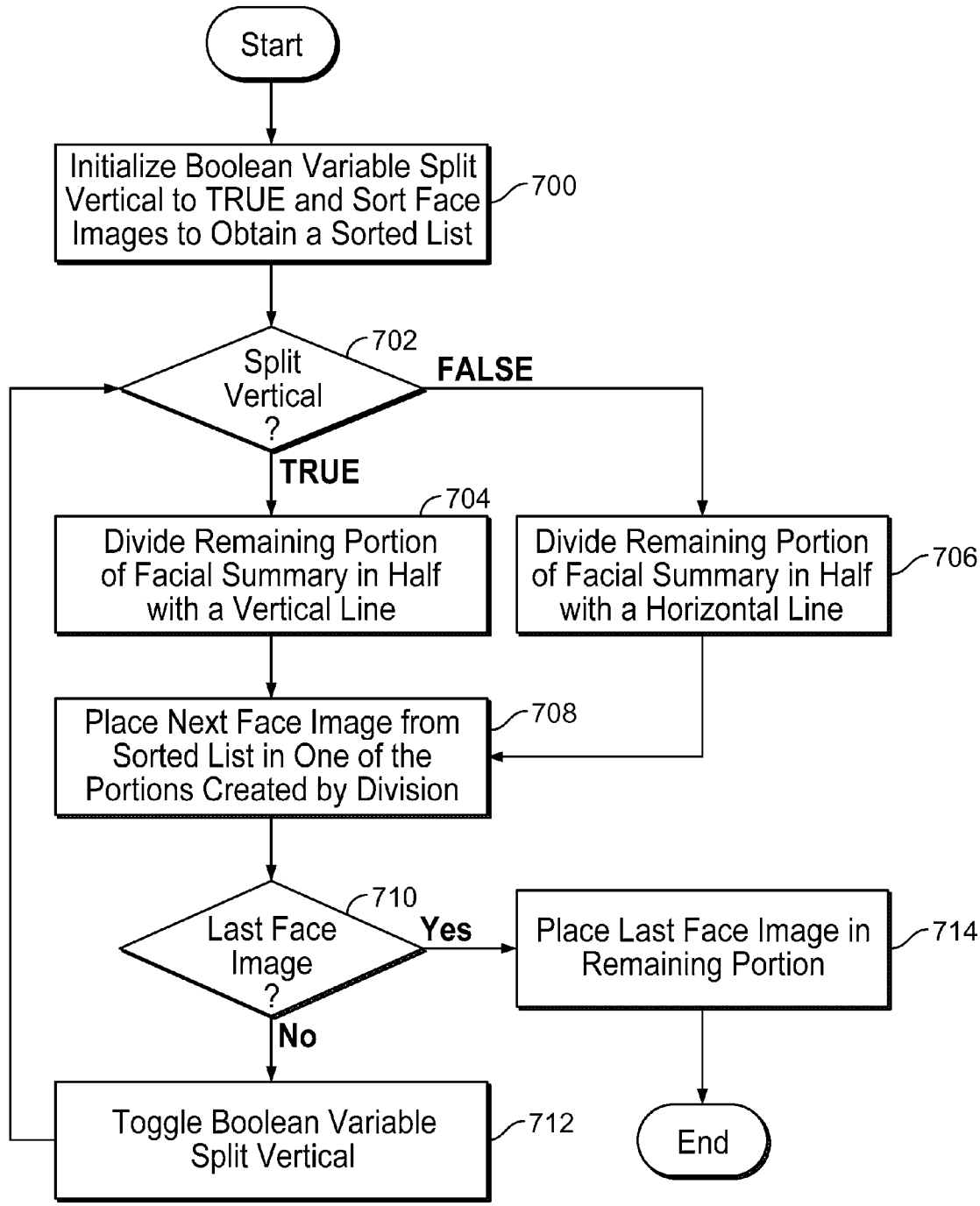
FIG. 7 is a flowchart illustrating an embodiment of a process for laying out a facial summary by dividing a remaining portion of a facial summary in half.

FIG. 7 is a flowchart illustrating an embodiment of a process for laying out a facial summary by dividing a remaining portion of a facial summary in half. In some embodiments, the example process is used to lay out a facial summary at 106. Using the example process, a facial summary without any whitespace or gaps is able to be generated.

At 700, a Boolean variable split vertical is initialized to TRUE and face images are sorted to obtain a sorted list. The face images sorted at 700 are the face images that will be included in the facial summary. It is determined at 702 if split vertical is TRUE or FALSE. If it is TRUE, at 704 a remaining portion of a facial summary is divided in half with a vertical line. If it is FALSE, a remaining portion of a facial summary is divided in half with a horizontal line at 706. At the first iteration, the remaining portion includes the entire facial summary since none of the face images have been placed yet. At other iterations, the remaining portion is the portion of the facial summary where a facial image has not yet been placed.

At 708, the next face image from the sorted list is placed in one of the portions created by the division. If needed, in various embodiments cropping, resizing, zooming, or other processing is performed to fit a face image into a space. In some embodiments, some placement pattern is used to insert or place a face at 708. For example, if a vertical split is performed at 704, in some embodiments the next face image is placed in the left (right) portion created by the division and if a horizontal split is performed at 706 the next face image is placed in the top (bottom) portion.

It is determined at 710 if it is the last face image. For example, the end of the sorted list may have been reached and only one face image remains to be placed. If so, the last face image is placed in the remaining portion at 714. Otherwise, at 712 the Boolean variable split vertical is toggled. For example, if it was TRUE then it is changed to FALSE and vice versa.

As an example, facial summary 310 in FIG. 3 may be generated using the example process described above. A vertical line is drawn, dividing facial summary 310 into two halves. Face image 312 is the first image to be placed and is placed in the left half of facial summary 310. A horizontal line is drawn next and face image 316 is placed in the lower right portion. Face image 314 is the only image that remains to be placed and is placed in the top right portion.

Figure 8:
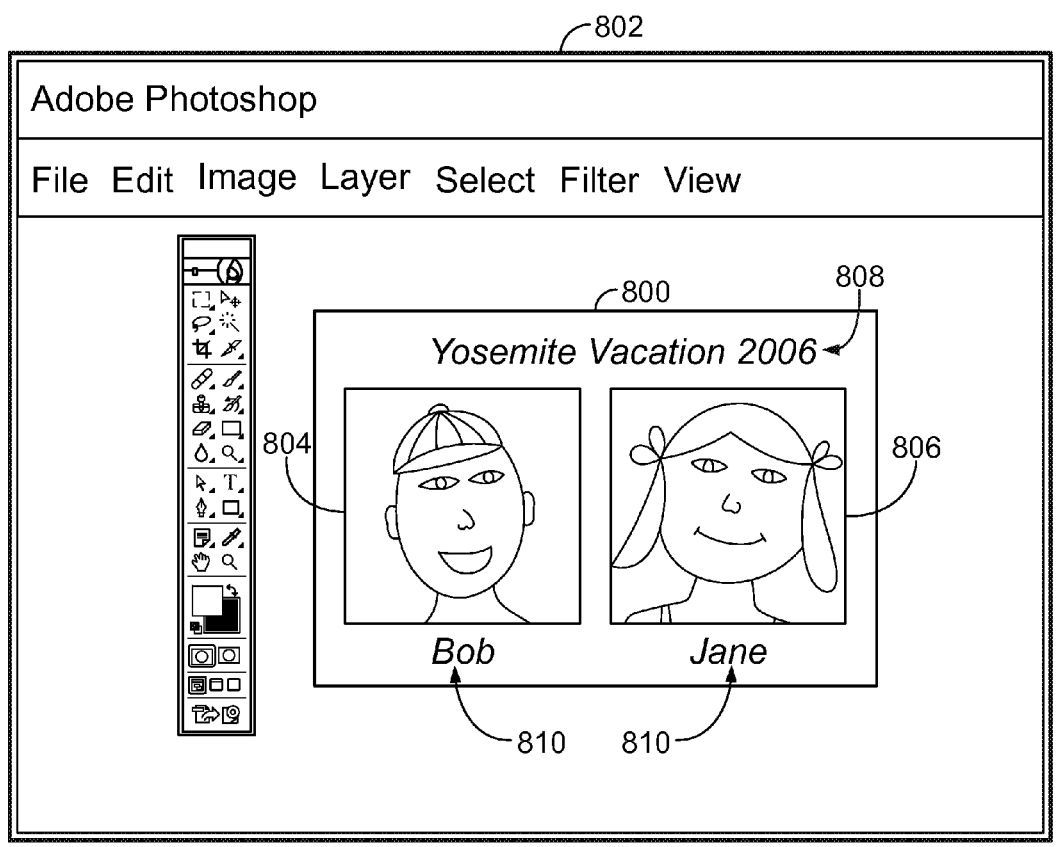
FIG. 8 is a diagram illustrating an embodiment of a facial summary edited using an image editing application.

FIG. 8 is a diagram illustrating an embodiment of a facial summary edited using an image editing application. In the example shown, facial summary 800 is edited using application 802 (i.e., Adobe Photoshop). For example, facial summary 800 may be generated automatically and is opened using application 802. Using application 800, a user is able to modify or otherwise edit facial summary 800. In this example, the user has added some text to the image. Title 808 says "Yosemite Vacation 2006" and names 810 say "Bob" and "Jane." In this example, the user has selected a certain font for title 808 and names 810 and has positioned the text in facial summary 800. Title 808 is centered and is positioned above face images 804 and 806 and names 810 are located below face images 804 and 806 and identify the people depicted in each face image.

In some embodiments, a user is able to adjust face image 804 and/or 806. For example, using application 802, a user may (if desired) move face image 804 or 806 up, down, left, or right within facial summary 800. In some embodiments, a user is able to adjust the zoom, size, or cropping of a face image in facial summary.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining a plurality of sets of face images associated with a video, wherein each set corresponds to a particular person depicted in the video;
    of the people associated with the plurality of sets of face images, selecting one or more of those people to include in a facial summary by:
        analyzing the plurality of sets of face images and/or the video;
        determining an importance value associated with a degree to which a person is prominent within the video for each of the people associated with the plurality of sets of face images, wherein determining the importance value is based at least in part on the analysis including (1) a number of face images in that set and (2) an average face size associated with the face images in that set; and
        selecting one or more people to include in the facial summary based at least in part on the importance values;
    for each of the selected one or more people, selecting a face image from a group of potential face images to use in the facial summary based at least in part on the image quality of the potential face images in the group; and
    using a processor to lay out the facial summary using the selected face images, including by sizing the selected face images in the laid-out facial summary based at least in part on the importance values.

2. A method as recited in claim 1, wherein obtaining includes performing automatic face detection on the video.

3. A method as recited in claim 1, wherein selecting one or more people includes one or more of the following: using a maximum number of people, using a number of face images included in a particular set, using face image size, using average face image size for a particular set, or using a duration of time associated with a particular person appearing in the video.

4. A method as recited in claim 1, wherein at least one of the face images selected to be used in the facial summary is not obtained from the video.

5. A method as recited in claim 1, wherein selecting a face image to use in the facial summary includes, for a given person, selecting a face image from the set of face images associated with the given person.

6. A method as recited in claim 1, wherein the image quality used to select the face image includes at least one of: brightness, contrast, sharpness, direction of a person's face, or blinking.

7. A method as recited in claim 1, wherein laying out the facial summary includes:
    dividing a remaining portion of the facial summary into at least two portions; and
    placing one of the selected face images in one of the portions created by the division.

8. A method as recited in claim 1, wherein laying out the facial summary includes adjusting the size of a face image included in the facial summary based at least in part on a ranking.

9. A method as recited in claim 1 further comprising:
    receiving a modification to the facial image; and
    presenting the facial image with the modification applied.

10. A method as recited in claim 1 further comprising:
    receiving a modification to the facial image; and
    presenting the facial image with the modification applied, wherein the modification includes a modification associated with text.

11. A method as recited in claim 1 further comprising:
    receiving a modification to the facial image; and
    presenting the facial image with the modification applied, wherein the modification includes a modification to an object associated with the facial image.

12. A system, comprising:
    a processor; and
    a memory coupled with the processor, wherein the memory is configured to provide the processor with instructions which when executed cause the processor to:
        obtain a plurality of sets of face images associated with a video, wherein each set corresponds to a particular person depicted in the video;
        of the people associated with the plurality of sets of face images, select one or more of those people to include in a facial summary by:
            analyzing the plurality of sets of face images and/or the video;
            determining an importance value associated with a degree to which a person is prominent within the video for each of the people associated with the plurality of sets of face images, wherein determining the importance value is based at least in part on the analysis including (1) a number of face images in that set and (2) an average face size associated with the face images in that set; and
            selecting one or more people to include in the facial summary based at least in part on the importance values;
        for each of the selected one or more people, select a face image from a group of potential face images to use in the facial summary based at least in part on the image quality of the potential face images in the group; and
        lay out a facial summary using the selected face images, including by sizing the selected face images in the laid-out facial summary based at least in part on the importance values.

13. A computer program product embodied in a non-transitory computer readable storage medium and comprising computer instructions for:
    obtaining a plurality of sets of face images associated with a video, wherein each set corresponds to a particular person depicted in the video;

of the people associated with the plurality of sets of face images, selecting one or more of those people to include in a facial summary by:
analyzing the plurality of sets of face images and/or the video;
determining an importance value associated with a degree to which a person is prominent within the video for each of the people associated with the plurality of sets of face images, wherein determining the importance value is based at least in part on the analysis including (1) a number of face images in that set and (2) an average face size associated with the face images in that set; and
selecting one or more people to include in the facial summary based at least in part on the importance values;
for each of the selected one or more people, selecting a face image from a group of potential face images to use in the facial summary based at least in part on the image quality of the potential face images in the group; and
laying out the facial summary using the selected face images, including by sizing the selected face images in the laid-out facial summary based at least in part on the importance values.

14. A computer program product as recited in claim 13, wherein the computer instructions for selecting one or more people include computer instructions for using a number of face images included in a particular set.

15. A computer program product as recited in claim 13, wherein the computer instructions for selecting one or more people include computer instructions for using face image size.

16. A computer program product as recited in claim 13, wherein the image quality used to select the face image includes at least one of: brightness, contrast, sharpness, direction of a person's face, or blinking.

17. A computer program product as recited in claim 13, the computer program product further comprising computer instructions for:
receiving a modification to the facial image; and
presenting the facial image with the modification applied.

18. A system as recited in claim 12, wherein the image quality used to select the face image includes at least one of: brightness, contrast, sharpness, direction of a person's face, or blinking.

19. A system as recited in claim 12, wherein laying out the facial summary includes:
dividing a remaining portion of the facial summary into at least two portions; and
placing one of the selected face images in one of the portions created by the division.

20. A computer program product as recited in claim 13, wherein laying out the facial summary includes:
dividing a remaining portion of the facial summary into at least two portions; and
placing one of the selected face images in one of the portions created by the division.

21. A method as recited in claim 1, wherein determining the importance value further includes using $(w_1*F_i)+(w_2*R_i)$ as the importance value where $w_1$ and $w_2$ are weighting factors, $F_i$ is said number of face images in that set, and $R_i$ is said average face size associated with the face images in that set.

22. A system as recited in claim 12, wherein the processor is configured to determine the importance value further by using $(w_1*F_i)+(w_2*R_i)$ as the importance value where $w_1$ and $w_2$ are weighting factors, $F_i$ is said number of face images in that set, and $R_i$ is said average face size associated with the face images in that set.

23. A computer program product as recited in claim 13, wherein the computer instructions for determining the importance value further include computer instructions for using $(w_1*F_i)+(w_2*R_i)$ as the importance value where $w_1$ and $w_2$ are weighting factors, $F_i$ is said number of face images in that set, and $R_i$ is said average face size associated with the face images in that set.

* * * * *